Feb. 5, 1963   L. W. JOHNSON   3,076,511
ATTACHMENT MOUNTING PARTS FOR A PLANTER FURROW OPENER
Filed Dec. 22, 1958   2 Sheets-Sheet 2

*INVENTOR.*
LESLIE W. JOHNSON
ATTORNEYS

United States Patent Office 3,076,511
Patented Feb. 5, 1963

3,076,511
ATTACHMENT MOUNTING PARTS FOR A PLANTER FURROW OPENER
Leslie W. Johnson, Moline, Ill., assignor to Deere & Company, Moline, Ill., a corporation of Delaware
Filed Dec. 22, 1958, Ser. No. 782,210
11 Claims. (Cl. 172—387)

This application is a continuation-in-part of my copending application, Ser. No. 711,242, filed January 27, 1958, for Cotton Planter.

The present invention relates generally to agricultural implements and more particularly to implements of the type that are adapted to be mounted on a farm tractor.

The object and general nature of this invention is the provision of a new and improved planter having novel furrow opening units with associated ground engaging means connected so as to be adjustable relative to the furrow opening units. A further feature of this invention is the provision of a new and improved mounting for gauge shoes associated with a planter, with new and improved means for holding the gauge shoes in different positions. An additional object of this invention is the provision of new and improved furrowers with new and improved means for optionally connecting the furrowers in different positions of vertical adjustment relative to the associated planter runners.

These and other objects and advantages of the present invention will be apparent to those skilled in the art after a consideration of the following detailed description of the preferred structure in which the principles of the present invention have been incorporated. In the accompanying drawings:

FIG. 2 shows a set of double disk furrowers for planting in shallow furrows, with new and improved means for adjustably fixing the furrowers in different positions of vertical adjustment.

Figure 1:
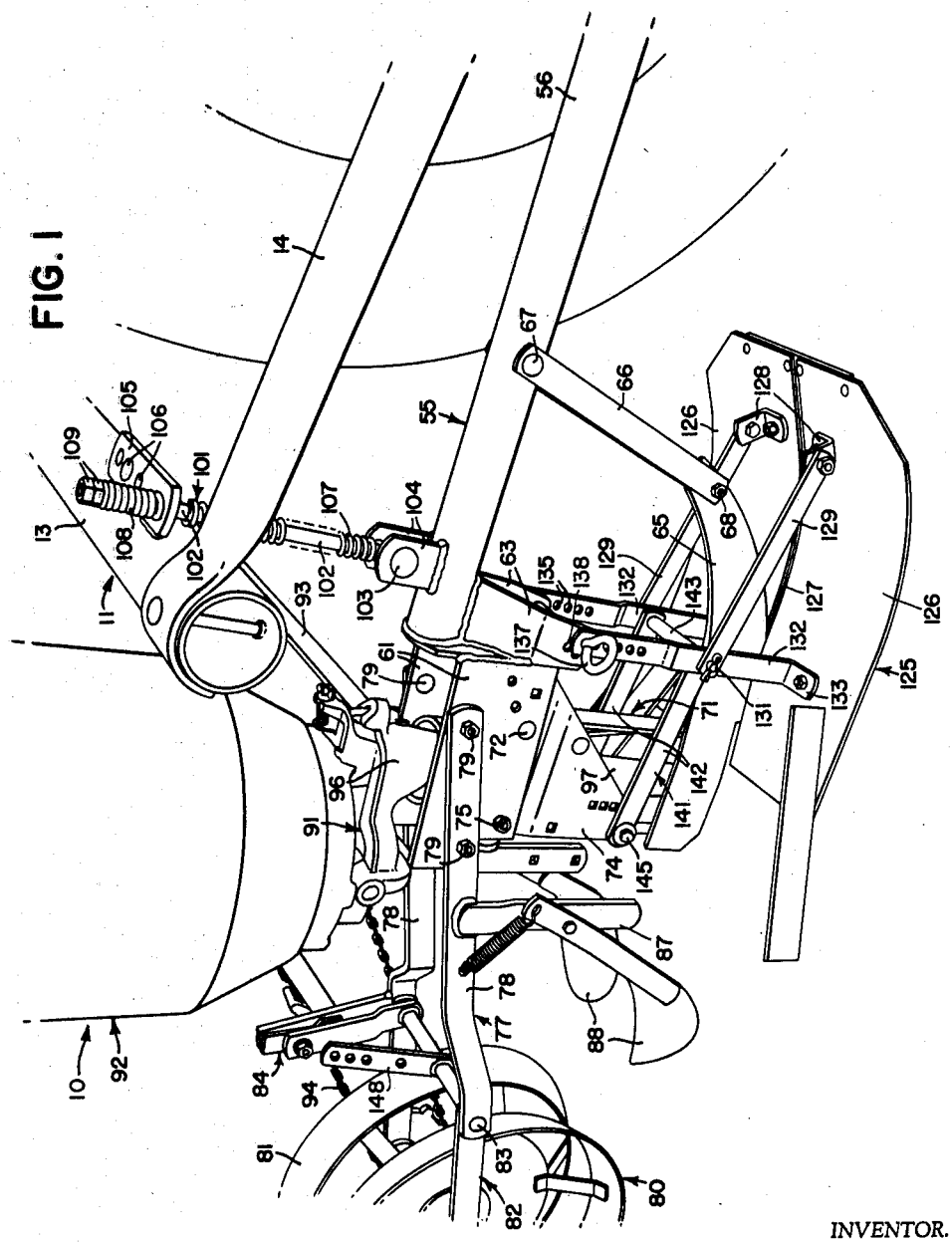
FIG. 1 is a fragmentary perspective view of a portion of a four-row planter in which novel means is shown for mounting a gauge shoe on the associated planter runner, with novel means for adjusting the position of the gauge shoe so as to provide a means for controlling the depth of planting.

Referring first to FIG. 1, the principles of this invention have been shown as embodied in a four-row integral planter indicated in its entirety by the reference numeral 10. The planter comprises a tractor-carried frame 11 that includes a front transverse bar and a rear transverse bar 13, the transverse bars being rigidly interconnected by generally fore-and-aft extending bars 14. Only the right hand bar 14 is shown in FIG. 1. The transverse and fore-and-aft extending bars are preferably in the form of pipes or tubular members. The frame 10 carries a plurality of furrow opener units, each of which is indicated by the reference numeral 55 and each being connected at its forward end to the associated forward transverse frame member (not shown) and each extending below and rearwardly of the rear frame member 13 as illustrated in FIG. 1. Each of the furrow opener units 55 includes a fore-and-aft extending pipe member 56 that is secured, as by welding, to a transverse sleeve rockably disposed on the front transverse bar. Secured to the rear end of each of the pipe members 56, as by welding, is a pair of bracket plates 61 that extend downwardly and rearwardly from the rear end of the pipe 56, and welded to each pair of plates 61, and also to the adjacent portion of the pipe 56, is a pair of downwardly extending bars 63 which form a yoke that acts with the bracket plates 61 to receive any one of several furrow opening or ground working and/or engaging means.

Figure 2:
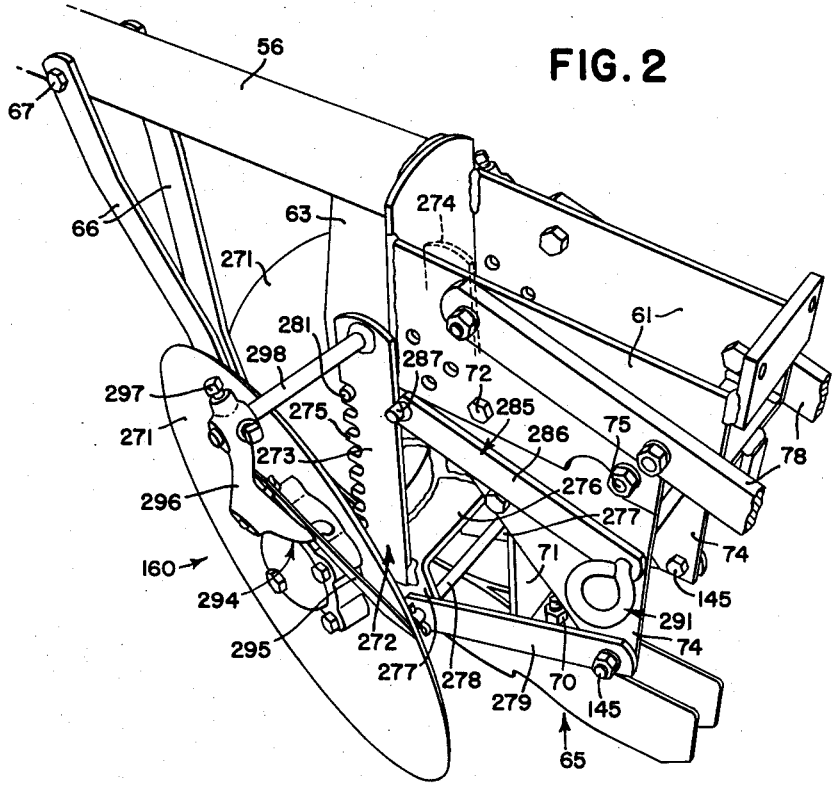
FIG. 2 is similar to FIG. 1, but instead of a gauge shoe.
Figure 3:
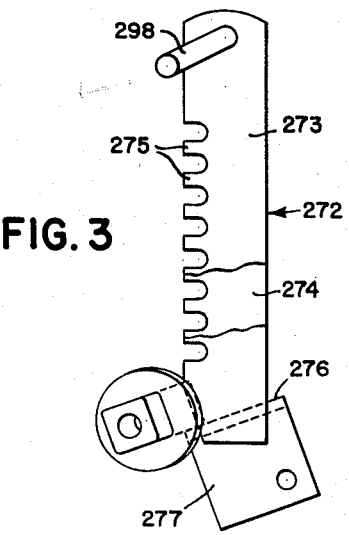
FIG. 3 is a fragmentary edge view of the furrower supporting frame.
Figure 4:
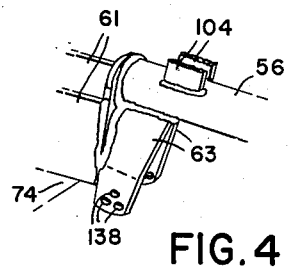
FIG. 4 is a detail view of a portion of one of the furrow opener units.

One of such ground-working or furrow opening means may take the form of a runner 65 that may be conventional per se so far as the principles of the present invention are concerned. The forward end of each runner 65 is connected by a pair of straps 66 to the associated pipe member 56, the straps 66 being connected to the latter by means of a bolt 67 and to the forward or upper end of the associated runner 65 by a bolt 68, the pipe 56 being apertured to receive the bolt 67. The rear portion of each runner 65 includes a rear cross bar (not shown) to which the lower end of an L-shaped bracket 71 is connected by any suitable means, such as a bolt 70 (FIG. 2). At its upper end the aforesaid bracket 71 is connected by bolt means 72 or other suitable fastener to the bracket plates 61. Lower extension plates 74 are connected to the plates 61 by bolt means 75 and also by the forward bolt means 72. The parts 61, 63 and 74 constitute a pair of brackets fixed to the rear end of the pipe member 56.

As shown in FIG. 1, a press wheel frame 77, which includes two generally fore-and-aft extending bars 78, is rigidly connected to the bracket plates 61 by a pair of bolts 79 or other suitable means, and pivotally connected to the rear end of the frame 77 is a press wheel unit 80 that includes a press wheel 81 and a press wheel frame 82. The press wheel frame 82 is pivotally connected at 83 with the rear ends of the frame bars 78 and may be disposed in different positions of adjustment by a hand lever 84 and associated fixed locking sector (not shown), the parts being of usual construction. The hand lever 84 may be locked out when desired to permit the press wheel to float, and the frame bars 78 carry depending standards 87 to which spring biased covering knives 88 are swingably connected.

A hopper support casting 91 is connected in any suitable way to the bracket plates 61 and carries a seed hopper 92. The weight of the hopper and contents is imposed directly on the rear end of the pipe or drawbar 56 so that this weight ensures the penetration of the associated runner 65 to the desired depth. The rear portions of the furrow opener units are interconnected by cross bars 93, the ends of the bars 93 being pivotally connected in any suitable way to lugs or the like at the rear portions of the bracket plates 61. Each hopper 92 includes conventional seed dispensing means driven from the associated press wheel 81 by suitable drive chain means 94. Seed dispensed by the above-mentioned dispensing means in the hoppers 92 is delivered into associated spout sections 96 from which the seed falls through seed tubes 97 into the furrows made by the associated runners 65.

Each furrow opener unit 55 is independently connected with the associated rear frame pipe 13 by a lifting and cushioning means 101. The latter includes a rod 102 swingably connected by trunnion means 103 with a pair of apertured lugs 104 fixed, as by welding, to the rear portion of the associated pipe 56. The upper end of the rod 102 extends through one of several openings provided in a bracket 105 fixed to the adjacent portion of the rear frame member 13. A pressure spring 107 is disposed between the lugs 103 and the associated bracket 105, and a cushioning spring 108 disposed between the upper side of the bracket 105 and a pair of lock nuts 109 carried at the upper end of the rod 102, the upper end of which is threaded to receive the lock nuts 109. Thus, when the power lift of the associated tractor is actuated to lift the rear end of the frame 11, the rear ends of all of the units 55 are raised through the associated lifting and cushion means 101. The springs 108 serve to protect the frame 11 against impact shocks that may occur when the outfit is moved in a raised or transport position over rough ground or the like. In operation, if desired the weight of the rear portion of the frame 11 may be added to the several furrow opener units 55 by lowering the lift arms of the tractor power lift system, whereupon the rear portion of the frame 11 is lowered against the springs 107, thus adding the weight of the rear portion of the frame to the several furrow opener units to ensure proper penetration of the associated furrow openers.

Any one of a number of different types of furrow openers and/or associated parts, as required by soil conditions, farming practices, and/or other factors, may be connected with the bracket plates 61. For example, FIG. 1 shows a new and improved gauge shoe unit 125 that may be connected to the rear bracket plates 61 and their associated parts, the gauge shoe unit being so constructed and arranged as to provide for easy and convenient adjustment of the unit relative to the associated runner 65.

Referring now to FIG. 1, the unit 125 includes a pair of gauge shoe plates 126 suitably connected together with a space 127 in between so as to permit the rear portion of the gauge shoe plates to be disposed at opposite sides of the runner 65 with sufficient clearance to accommodate vertical adjustment of the unit 125 relative to the runner 65. Fixed to the forwardly and upwardly curved portions of the gauge shoe plates 126 are brackets 128 to which rearwardly and upwardly extending links 129 are pivotally connected. The rear ends of the links 129 are apertured to receive a cross pin 131 that extends through suitable apertures formed in a pair of upstanding brackets 132. The latter are fixed at the lower ends 133 to the generally rear portions of the gauge shoe plates 126. The links 129 and standards 132 form rigid attaching means carried by the gauge shoe plates, and the upper ends of the standards 132 are provided with a plurality of apertures 135, in any registering set of which an attaching pin 137 may be disposed. This pin is adapted to be inserted in any one of several openings 138 formed in the lower portion of the yoke parts 63. A pusher frame 141 connects the standards 132 with the rear or lower portions of the extension brackets 74, and the frame 141 comprises a pair of arms or bars 142 secured, as by welding, to a sleeve 143 that is disposed about the pin or rod 131. The rear ends of the bars 142 are apertured to receive pivot members 145 by which the push frame 141 is swingably connected with the extension brackets 74.

To raise or lower the gauge shoe unit 125, all that is necessary to do is to remove the attaching pin 137, manually raise or lower the gauge shoes the necessary or desired amount, and then reinsert the attaching pin 137. The openings 138 are arranged not only above one another but also are spaced apart in a fore-and-aft direction, which permits the operator to change the angle of the gauge shoe plates 126 so as to tilt the front ends downwardly or upwardly, as desired, depending on whether the pin 137 is inserted in a pair of forward openings 138 or in a pair of rear openings. An arm 148 is fixed to the press wheel frame pivot member 83 and is apertured to receive adjustable spring pressure means (not shown) by which the desired amount of pressure is applied to the associated press wheel to ensure proper driving of the dispensing mechanism.

Another form of this invention is illustrated in FIG. 2 in which the gauge shoe unit 125 is replaced by a double-disk furrow that is indicated in its entirety by the reference numeral 160. In this form of the invention the yoke 63 on the pipe member 56 receives a pair of furrowing disks 271 disposed in forwardly converging and upwardly diverging relation and connected to the lower portion of a disk supporting frame 272 that is made up of a pair of left- and right-hand vertical bars 273 and 274 arranged in spaced apart relation and disposed at opposite sides of the bracket plates 61. The forward edges of the vertical bars 273 and 274 are notched, as at 275, and are integrally connected at their lower portions by a transverse U-shaped member 276 that is welded to the lower ends of the vertical bars 273 and 274 and is provided with depending apertured sections 277 to receive a transverse pin 278 that is similar to or identical with the cross pin 131 mentioned above. A pair of links 279, similar to or identical with the arms 142, are apertured at the forward ends to receive the pin 278 and are also apertured at the rear ends to receive the pivots 145 carried by the lower portions of the lower extension plates 74. In the form of the invention shown in FIG. 2, the bracket plates 63 are provided with abutment pins or studs 281 adapted to be selectively engaged in one of the notches 275 of each bar 273, depending on the vertical position desired for the furrowing disks 271.

The vertical notched bars 273 are held in engaged relation with the studs 281 by means of a locking brace 285 that is made up of a pair of bars 286 that are interconnected at the forward ends, as by being welded to a cross bar or rod 287. When the vertical disk-supporting bars 273 are engaged with the studs 281 the backing brace 285 holds the bars in position by virtue of contact between the rear edges of the bars 273 with the rod 287 at the forward ends of the links 286. The latter are apertured at the rear ends to receive an eye-pin 291 that extends through associated apertures in the rear edges of the plates 74 and held therein by any suitable retainer.

Associated with the furrowing disks 271 are scraper means 294 that may be of conventional construction so far as this invention is concerned. Briefly, each of the scraper means 294 includes a scraper blade 295 and a supporting casting 296, the upper end of which is provided with set screw means 297 that hold the associated scraper unit in different positions of adjustment on an associated supporting bracket 298, preferably in the form of a transverse rod, the inner end of which is securely fixed, as by welding, to the upper end of the associated vertical notched bar 273.

The furrowing disks 271 may be raised or lowered when desired without the use of any tools or the like. The retainer may be removed from the eye-pin 291 and the latter withdrawn. This permits the brace structure 285 to be dropped down and shifted rearwardly an amount sufficient to permit disengagement of the notched forward edges of the bars 273 from the associated abutment pins 281. Then by grasping the scraper supports 298, utilizing the latter as handles, the disks 271 may be raised or lowered as desired and the bars 273 reengaged with the studs 281, after which the brace 285 is raised and the pin 291 reinserted. Adjustments of this kind are usually made in the field, therefore the feature of this invention wherein such adjustments may be effected without the use of tools is of considerable value.

While I have shown and described above the preferred structure in which the principles of this invention have been incorporated, it is to be understood that my invention is not to be limited to the particular details, shown and described above, but that, in fact, widely different means may be employed in the practice of the broader aspects of my invention.

What I claim therefore, and desire to secure by Letters Patent is:

1. In a planter, a generally fore-and-aft extending member having a forward terminal end adapted to be connected to a tractor and a rear terminal end, a pair of brackets fixed to the rear end of said member, each of said brackets lying on opposite sides of the longitudinal axis of the fore-and-aft extending member, a furrow opener runner, means connecting said furrow opener runner to said pair of brackets comprising a third bracket secured at one end to said furrow opener runner, another portion of said third bracket being secured to said pair of brackets, a pair of arms disposed at opposite sides of said runner, means pivotally securing the rear ends of said arms to said pair of brackets, respectively, ground engaging means, means connecting said ground engaging means to the forward ends of said arms, including a pair of upwardly extending members connected with said ground engaging means and pivoted to the forward portion of said arms and extending upwardly alongside said brackets, and means connecting the upper portions of said members to said brackets at different positions of vertical adjustment relative thereto.

2. In a planter, a generally fore-and-aft extending member having a forward terminal end adapted to be connected to a tractor and a rear terminal end, a pair of brackets fixed to the rear end of said member, each of said brackets lying on opposite sides of the longitudinal axis of the fore-and-aft extending member, a furrow opener runner, means connecting said furrow opener runner to said pair of brackets comprising a third bracket secured at one end to said furrow opener runner, another portion of said bracket being secured to said pair of brackets, a pair of arms disposed at opposite sides of the runner, means pivotally securing the rear ends of said arms to said pair of brackets, respectively, a gauge shoe disposed at the front and on opposite sides of said runner and having a pair of upwardly extending bars fixedly connected at their lower portions with said gauge shoe, means pivotally connecting the forward ends of said arms with said upwardly extending bars below the upper ends of the latter, and means connecting the upper ends of said upwardly extending bars to said brackets at different positions of vertical adjustment relative thereto.

3. In a planter, a generally fore-and-aft extending member having a forward terminal end adapted to be connected to a tractor and a rear terminal end, a pair of brackets fixed to the rear end of said member, a furrow opener runner, means connecting said furrow opener runner to said pair of brackets comprising a third bracket secured at one end to said furrow opener runner, another portion of the third bracket being secured to said pair of brackets, a gauge shoe unit including a pair of upwardly extending members and brace means connected between a portion of said runner and said members whereby the latter forms a rigid part of said gauge shoe unit, means pivotally connecting said members with the forward portion of said arms, said members extending upwardly alongside said brackets, and means connecting the upper portions of said members to said brackets to different positions of vertical and fore and aft adjustment relative thereto.

4. In a planter, a generally fore-and-aft extending member having a forward terminal end adapted to be connected to a trailer and a rear terminal end, a pair of brackets fixed to the rear end of said member, each of said brackets lying on opposite sides of the longitudinal axis of the fore-and-aft extending member, a furrow opener runner, means connecting said furrow opener runner to said pair of brackets comprising a third bracket secured at one end to said furrow opener runner, another portion of said third bracket being secured to said pair of brackets, a pair of arms disposed at opposite sides of said runner, means pivotally securing the rear ends of said arms to said pair of brackets, respectively, a disk-supporting frame connected to the forward ends of said arms and including a pair of upwardly extending members pivoted at their lower portions to the forward portions of said arms, said members extending upwardly alongside said brackets, furrowing disks journaled on the lower portions of said upwardly extending member, and means connecting the upper portions of said members to said brackets at different positions of vertical adjustment relative thereto.

5. The invention set forth in claim 4, further characterized by said last mentioned means comprising brace means removably connected with said brackets and engaging with said disk-supporting frame for holding the latter in selected position.

6. The invention set forth in claim 4, further characterized by scraper means for each furrowing disk, said scraper means including a scraper blade and blade-supporting means fixed to the upper portion of each upwardly extending member, and each blade-supporting means including handle means by which the disks may be raised and lowered manually.

7. In a planter, a generally fore-and-aft extending member having a forward terminal end adapted to be connected to a tractor and a rear terminal end, a pair of brackets fixed to the rear end of said member, each of said brackets lying on opposite sides of the longitudinal axis of the fore-and-aft extending member, a furrow opener runner, means connecting said furrow opener runner to said pair of brackets comprising a third bracket secured at one end to said furrow opener runner, another portion of said third bracket being secured to said pair of brackets, a pair of arms disposed at opposite sides of said runner, means pivotally securing the rear ends of said arms to said pair of brackets, respectively, a vertical disk-supporting frame pivotally connected with the forward ends of said arms, said frame including a pair of upwardly extending bars disposed at the outer sides of said pair of brackets and notched along their forward edges, notch-entering abutment means on said upwardly extending bars adapted to be selectively engaged with said notches for determining the relation between said runner and said furrower disks, and means releasably connected with said brackets for holding said bars in engagement with said notch-entering abutment means.

8. The invention set forth in claim 7, further characterized by said releasably connected means comprising a transverse part engageable with the rear portions of said vertical bars and arms fixed to said transverse part and releasably pivoted to said brackets.

9. In a planter, a generally fore-and-aft extending member having a forward terminal end adapted to be connected to a tractor and a rear terminal end, a pair of brackets fixed to the rear end of said member, each of said brackets lying on opposite sides of the longitudinal axis of the fore-and-aft extending member, furrow opener means, means connecting said furrow opener means to said pair of brackets comprising a third bracket secured at one end to said furrow opener means, another portion of said third bracket being secured to said pair of brackets, a pair of arms disposed at opposite sides of said furrow opener means, means pivotally securing the rear ends of said arms to said pair of said brackets, respectively, ground engaging means connected to the forward ends of said arms, a pair of upwardly extending members connected with said ground engaging means, means establishing a pivot connection between said members and the forward portions of said arms, said members extending upwardly alongside said brackets and having a plurality of apertures in their upper portions, said brackets also being apertured, a detachable pin releasably disposed in the bracket apertures in selected ones of said plurality of apertures for connecting the upper portions of said members to said brackets at different positions of vertical adjustment relative thereto.

10. The invention set forth in claim 9, further characterized by the apertured portions of said brackets including generally fore-and-aft spaced apertures, whereby said detachable pin may be disposed in selected bracket apertures to provide for different angular positions of said ground engaging means in addition to the optional vertical positions provided by the apertures in said vertically extending members.

11. In a planter, a generally fore-and-aft extending member having a forward terminal end adapted to be connected to a tractor and a rear terminal end, a pair of brackets fixed to the rear end of said member, each of said brackets lying on opposite sides of the longitudinal axis of the fore-and-aft extending member, a furrow opener runner, means connecting said furrow opener runner to said pair of brackets comprising a third bracket secured at one end to said furrow opener runner, another portion of said third bracket being secured to said pair of brackets, a pair of arms, means pivotally securing the rear ends of said arms to said pair of brackets, respectively, said arms lying on opposite sides of said furrow opener runner, ground engaging means, a pair of upwardly extending members connected with said ground engaging means and extending upwardly alongside said brackets, means connecting the upper portions of said members to said brackets at different positions of vertical adjustment relative thereto, and means pivotally inter-connecting said ground engaging means with the forward ends of said arms.

References Cited in the file of this patent

UNITED STATES PATENTS

| | | |
|---|---|---|
| 548,449 | Nelson | Oct. 22, 1895 |
| 677,997 | Kothmann | July 9, 1901 |
| 1,031,167 | Bushnell | July 2, 1912 |
| 1,209,430 | Greimann | Dec. 19, 1916 |
| 1,392,732 | Zarmstorf | Oct. 4, 1921 |
| 1,681,023 | White | Aug. 14, 1928 |
| 1,695,608 | Resseguie | Dec. 18, 1928 |
| 2,230,331 | Mobley | Feb. 4, 1941 |
| 2,357,849 | Ray | Sept. 12, 1944 |
| 2,376,559 | Smith | May 22, 1945 |
| 2,656,801 | Hansen | Oct. 27, 1953 |
| 2,734,439 | Padrick | Feb. 14, 1956 |

FOREIGN PATENTS

| | | |
|---|---|---|
| 115,048 | Switzerland | Apr. 22, 1925 |